Patented July 14, 1931

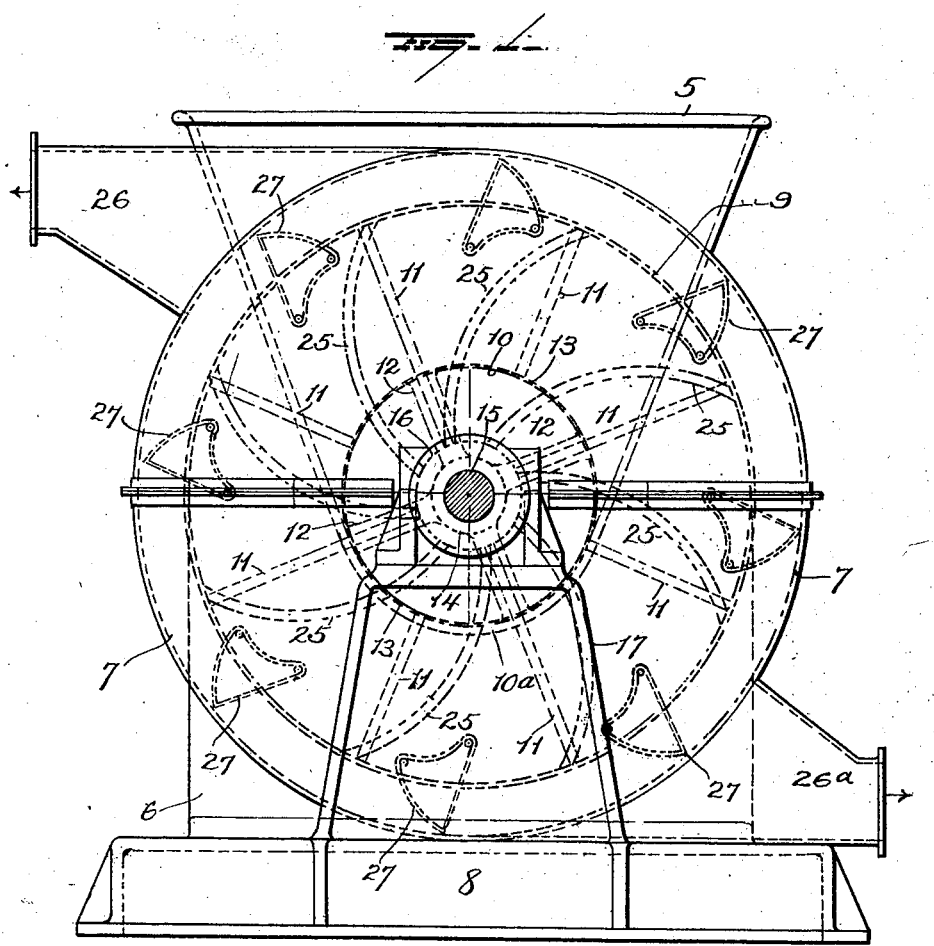

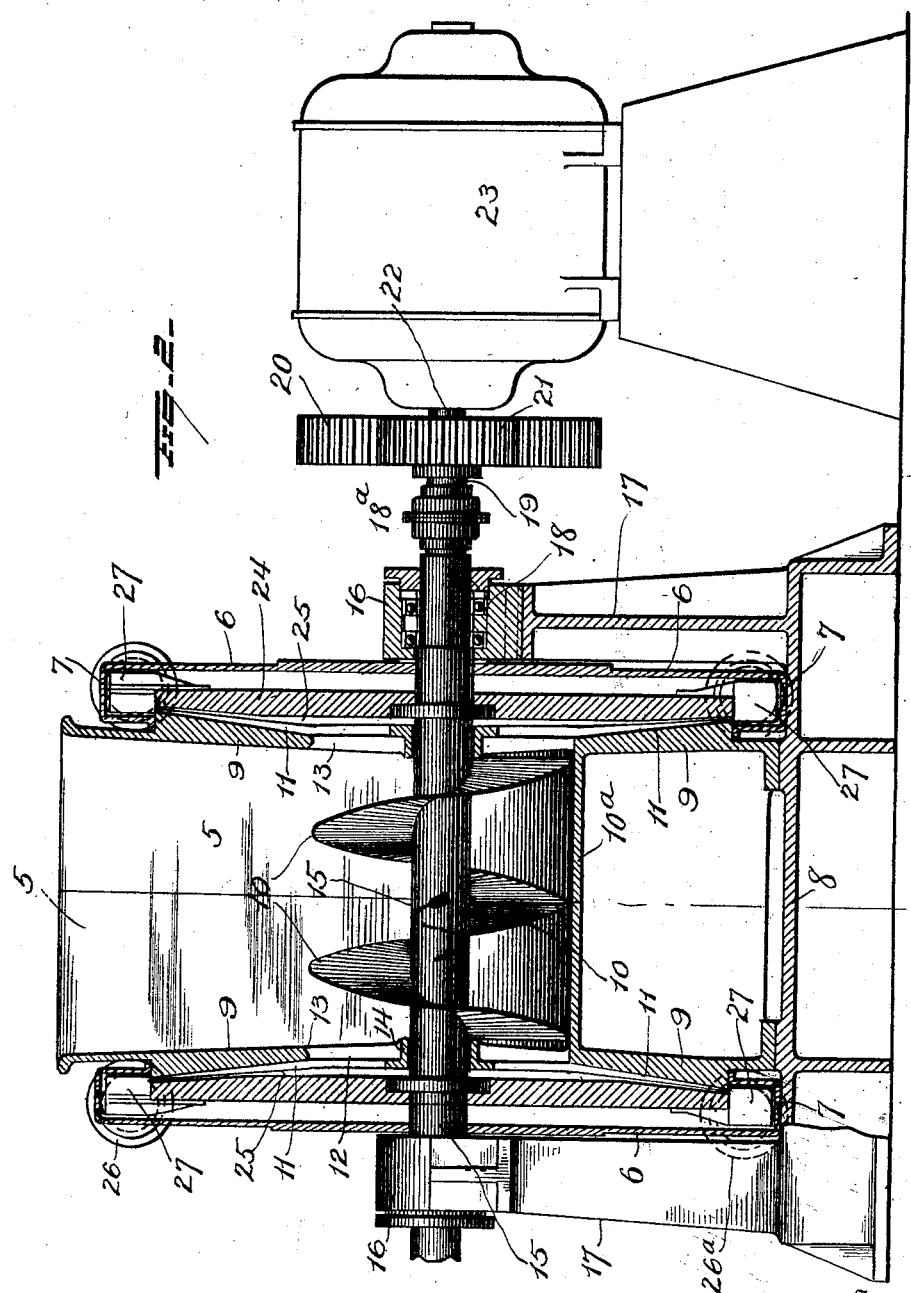

1,814,177

UNITED STATES PATENT OFFICE

WILLIAM HENRY MORGAN, OF ALLIANCE, OHIO, ASSIGNOR, BY MESNE ASSIGNMENTS, TO THE MORGAN HURRYCANE COMPANY, OF NEW YORK, N. Y., A CORPORATION OF FLORIDA

CANE STALK DISINTEGRATOR

Application filed May 5, 1925. Serial No. 28,265.

My invention relates to improvements in apparatus for disintegrating cane stalks preparatory to the extraction of the juice from the same.

The principal objects of the present invention are to improve the construction and mode of operation of apparatus for disintegrating sugar cane and to produce an improved disintegrating machine which will operate efficiently to reduce sugar cane to a loose fibrous mass from which the juice may be readily extracted.

The features of the invention will be clearly understood from the accompanying drawings illustrating an apparatus embodying the invention in its preferred form and the following detailed description of the construction therein shown.

In the accompanying drawings: Figure 1 is a view in side elevation of an apparatus embodying the invention, and Figure 2 is a view partly in vertical central transverse cross section and partly in elevation of the apparatus.

The cane is prepared after or during the harvesting into short lengths, and the cut or short length sections of the stalks are fed into the hopper 5 of the disintegrating apparatus. This apparatus may be located in the field, or in the mill as may be preferred, and if located in the mill the cane stalks are transported to the mill in the usual and well known manner. The stalks may be transported to the mill before cutting them into short lengths, and the cutting done at the mill, as my invention relates to the disintegration or shearing machine irrespective of where the cutting or shearing is done.

The apparatus shown comprises two side casings, indicated at 6, located on opposite sides of the machine, the periphery of each of which is flanged or trough shaped as shown in Figure 2. The troughs 7 extend inwardly, or toward each other as shown, and are supported on the base or by the side frames. Also secured to the base 8 and extending upwardly therefrom are two stationary disks or members 9, which are connected by suitable walls $10^a$ and $10^b$ to form a hopper, the bottom wall $10^a$ of which is shaped to conform to the screw shaped feeders carried by the shaft 15.

The disks 9 are formed with outer faces which are inclined, as clearly shown in Figure 2, the said faces of the disks having substantially conical forms. Shredding knives 11 are mounted in grooves in the said disks and project from the outer faces thereof. These shredding knives preferably have the form shown in Fig. 1, the knives extending outwardly in the directions of planes containing the axis of the disks. As shown in Fig. 2, the knives 11 preferably are so formed that they diminish in thickness from the centers of the disks outwardly. The discs 9 are connected by and preferably formed integral with the bottom wall $10^a$ of the hopper and the forward and rear walls $10^b$ thereof. The disks 9 also are provided with radially arranged spokes 12 extending from hub portions 14 surrounding and engaging the shaft 15, thereby providing openings 13 between the spokes, through which the material may be fed to the spaces between the disks 9 and the rotary disks 24.

The shaft 15 passes through the side frames or casings 6, and is supported in bearings 16 carried by the upper ends of the castings 17, which are preferably formed integral with the base 8, as shown in Figure 2. Each bearing 16 preferably is provided with anti-friction bearing elements 18 for the shaft 15, and the latter is coupled, by any suitable coupling $18^a$ with the shaft 19 carrying the large gear 20, which is driven by the smaller gear 21 on the armature shaft 22 of the motor 23.

There may, if desired, be another driving motor connected by gearing with the other end of shaft 15 and the two motors may be arranged to operate in unison. The motors however may be independent of each other, so that in the event of a break down of one of the motors the apparatus may be driven by the other motor, thus providing for the continuous operation of the apparatus.

Mounted on the shaft 15 respectively intermediate between each side casing 6 and the corresponding stationary disk 9, are two rotating disks 24 rigidly secured to the said shaft. These disks preferably are provided with inner faces inclined substantially as shown in Fig. 2, these faces having a conical formation. These inner faces are provided with grooves, in which are mounted curved disintegrating knives or shear blades 25 which latter are preferably seated in said grooves. The disintegrating knives preferably diminish in thickness from their inner portions outwardly, as shown in Fig. 2, and are arranged so that when the fixed and rotatable disks are assembled, the adjacent faces of the knives respectively on the fixed and rotatable disks will be substantially parallel and slightly separated from each other. The formation of the conical outer face of each of the fixed disks 9 and the conical inner face of the corresponding rotary disk 24 is such that when the disks are assembled, a conical chamber is formed between the disks diminishing in width from the common axis toward the peripheries of said disks.

By locating the knives in grooves in the disks they can be adjusted to compensate for wear by shims inserted within the grooves under the knives, and it is clearly evident that the results desired can be accomplished by beveling the knives so as to produce a projecting cutting edge, or that they may be rectangular in cross section and produce substantially the same results.

Secured to the shaft 15 are the spiral conveyors or propellers 10 which operate respectively to force the cane through the openings in the disks 9 into the spaces between the disks 9 and 24. These propellers have approximately the same diameter as the diameter of the feed openings in the hopper, and, as shown in Fig. 2, are constructed to feed the cut stalks in both directions and evenly distribute the material deposited in the hopper to the two sets of disintegrating devices.

In the operation of the apparatus, the cut stalks are dumped or fed into the hopper 5 and gravitate to the bottom of the hopper and are engaged by the spiral conveyors 10 which force the same through the side openings 13 in the disks 9. The weight of the material above assists materially the feed screws 10 in forcing the cane or other sugar producing material through the openings 13 and into contact with the knives or shredders 11 and 25, the former of which are stationary and the latter rotate with shaft 15 as above explained. The rotating disks 24 revolve rapidly, and the cane or other material coming in contact with the knives on the revolving disks will be carried or dragged and thrown by centrifugal force between the disks and the knives carried thereby and will be disintegrated or sheared longitudinally into a fibrous mass, and thus be put in a condition to be readily passed between juice extracting rolls without any further crushing.

The knives or cutters on the revolving disks being curved in scimiter shape, assist in throwing the material from the centers of the disks outwardly toward the peripheries thereof where it is thrown or falls into the troughs 7. Each of these troughs extends wholly around the outer edge of the corresponding casing 6, and communicates with discharge nozzles or pipes 26 and 26ᵃ located respectively at the top and at the bottom of the trough which are connected respectively with pipes or conveyors leading to the expressing rolls. In the drawings I have shown discharge pipes for the disintegrated mass at the top and bottom, but it is evident that they may be at the top, or the bottom as found most convenient and efficient.

Secured to the rotating disks 24 are a series of paddles or fan blades 27, which are of substantially the same size as the cross sectional area of the trough 7, and operate to create a blast of air which causes the disintegrated material to be ejected through the discharge pipes 26—26ᵃ, and, as these paddles or fan blades are substantially as wide and as deep as the trough, they also operate to prevent the disintegrated material from sticking to the inside of the trough, but keep it in motion until discharged by the air blast through the discharge openings.

It is evident that many slight changes might be resorted to in the relative arrangement of parts shown and described without departing from the spirit and scope of my invention hence I would have it understood that I do not wish to confine myself to the exact construction and arrangement of parts shown and described but, Having fully described my invention what I claim as new and desire to secure by Letters-Patent, is :—

1. In an apparatus for disintegrating cane stalks, the combination of two stationary disks having shearing devices on their outer faces, and feed openings adjacent the centers of said disks, a hopper intermediate between said disks and communicating with said feed openings, a rotary shaft passing through the disks, disks secured to said rotary shaft and provided on their inner faces with shearing shredding knives which co-act with the knives on the stationary disks, and screw shaped feeding blades on the shaft within the hopper for positively feeding the stalks to the shearing knives.

2. In an apparatus for disintegrating cane stalks, the combination of two stationary disks, the upper portion of which constitutes a hopper, the said disks being provided with discharge openings communicating with the hopper adjacent the center of the disks, the bottom of the hopper being curved and terminating below the discharge openings, a rotary shaft passing through said disks, disks secured to said shaft and provided on their inner faces with shearing knives which co-act with the knives on the stationary disks, and force feed devices on the shaft and within the hopper.

3. In an apparatus for disintegrating cane stalks, the combination of two fixed disks having knives or cutters on their outer faces, a hopper between the disks, the hopper having exit openings for the cane, a shaft mounted to revolve and passing through said disks and provided with propeller shaped feeding devices for positively forcing the cane through the exit openings in the hopper, disks secured to the shaft and provided on their inner faces with knives or cutters co-acting respectively with the knives or cutters on the stationary disks, and casings each having a peripheral trough encircling a fixed disk and the cooperating rotary disk, and a discharge outlet from said trough.

4. In an apparatus for disintegrating sugar cane, the combination of two fixed disks having central openings, a hopper between said disks and extending below said openings, a shaft passing through the openings in said disks and provided with force feed devices, the said disks having shearing projections on their outer surfaces, disks on said shaft and provided with shearing projections co-acting with the shearing projections on the fixed disks, means for rotating said shaft, and casings respectively covering the fixed disks and each provided with a peripheral trough for receiving the sheared sections of the cane stalks, and a discharge outlet leading from each trough.

5. In an apparatus for disintegrating sugar cane stalks, the combination of two fixed disks each having an opening therein, a hopper between said disks and discharging into said openings, shearing means on the outer faces of said fixed disks, a shaft passing through both disks and provided with propeller shaped feeding devices, disks secured to said shaft and provided on their inner faces with sugar cane shearing means co-acting respectively with the shearing means on the fixed disks, troughs surrounding respectively the peripheries of the cooperating disks and adapted to receive the sheared cane and discharge outlets leading respectively from said troughs.

6. In an apparatus for disintegrating sugar cane, the combination with two fixed disks having shearing means on their outer faces, each disk having an opening through the same, a hopper intermediate between said disks and discharging through the openings in the latter, a rotary shaft passing through the disks and provided with means for feeding the cane stalks through the openings in said shearing disks, two disks fixed to said shaft and having shearing means on their inner faces adapted to cooperate with the shearing means on the fixed disks, troughs embracing respectively the cooperating disks and adapted to receive the sheared material, a series of fan blades secured to each revolving disk and arranged to move in the trough corresponding, and a discharge outlet for each trough.

7. In an apparatus for disintegrating sugar cane or other material, the combination of two fixed disks each having an opening therein and provided with shearing means on its outer face, a hopper intermediate between the disks and discharging into said openings, a revolving shaft having means for forcibly feeding the cut stalks through the openings in the fixed disks, two disks fixed on said shaft each having shearing means cooperating with the shearing means on the fixed disks, troughs embracing respectively the peripheries of the cooperating disks and arranged to receive the sheared material, blades mounted on the respective movable disks and extending into the troughs, the said blades being approximately as wide and deep as the corresponding trough, and a discharge opening for each trough.

8. In an apparatus for disintegrating sugar cane into a fibrous mass, inner fixed members each having a cane-confining face, outer rotary members each having a cane-confining face spaced from one of the cane-confining faces of said fixed members, devices carried respectively by the fixed and rotary members for shredding the cane to reduce the same to a fibrous mass and means for simultaneously feeding positively the cane stalks to the spaces between said fixed and rotary members.

9. In an apparatus for disintegrating sugar cane into a fibrous mass, inner fixed members each having a cane-confining face, outer rotary members each having a cane-confining face spaced from one of the cane-confining faces of said first members, devices carried respectively by the fixed and rotary members for shredding the cane to reduce the same to a fibrous mass, a hopper between said fixed members, and means located in the bottom of said hopper for simultaneously feeding positively the cane stalks to the spaces between said fixed and rotary members.

10. In an apparatus for disintegrating sugar cane into a fibrous mass, inner fixed members each having a cane-confining face, outer rotary members each having a cane-confining face spaced from one of the cane-confining faces of said first members, devices carried respectively by the fixed and rotary members for shredding the cane into a fibrous mass, a hopper between said fixed members, and a feed screw rotating in the lower portion of said hopper.

11. In an apparatus for disintegrating sugar cane into a fibrous mass, inner fixed members each having a cane-confining face, outer rotary members each having a cane-confining face spaced from one of the cane-confining faces of said first members, devices carried respectively by the fixed and rotary members for shredding the cane and a feed screw for feeding positively the cane stalks to the spaces between said fixed and rotary members.

12. In an apparatus for disintegrating sugar cane into a fibrous mass, inner fixed members each having a cane-confining face, outer rotary members each having a cane-confining face spaced from one of the cane-confining faces of said first members, shredding devices carried respectively by the fixed and rotary members for disintegrating the cane into a fibrous mass, and a feed screw for feeding the cane stalks in opposite directions to the spaces between said fixed and rotary members.

13. In an apparatus for disintegrating sugar cane into a fibrous mass, inner fixed members each having a cane-confining face, outer rotary members each having a cane-confining face spaced from one of the cane-confining faces of said first members, shredding devices carried respectively by the fixed and rotary members for disintegrating the cane into a fibrous mass, a hopper located between said fixed members, and a feed screw rotating substantially coaxially with said rotary members in the lower portion of said hopper for feeding the cane stalks simultaneously in opposite directions to the spaces between said fixed and rotary members.

In testimony whereof, I have signed this specification.

WILLIAM HENRY MORGAN.

CERTIFICATE OF CORRECTION.

Patent No. 1,814,177.  Granted July 14, 1931, to

WILLIAM HENRY MORGAN.

It is hereby certified that error appears in the printed specification of the above numbered patent requiring correction as follows: Page 2, line 113, claim 1, after "shearing" insert or; page 3, line 69, claim 6, before "trough" insert corresponding; and line 72, claim 7, strike out "or other material"; and that the said Letters Patent should be read with these corrections therein that the same may conform to the record of the case in the Patent Office.

Signed and sealed this 29th day of September, A. D. 1931.

(Seal)

M. J. Moore,
Acting Commissioner of Patents.